Sept. 3, 1963  M. L. BAKER  3,103,009
SIGNAL DETECTION SYSTEM
Filed Aug. 4, 1958  5 Sheets-Sheet 3

MELVIN L. BAKER
INVENTOR.

BY Jerry Q. Dinardo
agent

Morris Spector
ATTORNEY

Sept. 3, 1963   M. L. BAKER   3,103,009
SIGNAL DETECTION SYSTEM
Filed Aug. 4, 1958   5 Sheets-Sheet 4

Fig. 6

MELVIN L. BAKER
INVENTOR.
BY Jerry A. Dinardo, agent
Morris Spector,
ATTORNEY

Fig. 7

United States Patent Office 3,103,009
Patented Sept. 3, 1963

3,103,009
SIGNAL DETECTION SYSTEM
Melvin L. Baker, Los Angeles, Calif., assignor, by mesne assignments, to Thompson Ramo Wooldridge Inc., Cleveland, Ohio, a corporation of Ohio
Filed Aug. 4, 1958, Ser. No. 752,744
12 Claims. (Cl. 343—17.1)

This invention relates to the signal detection art, and in particular to improvements in systems for facilitating the detection of low level information signals in the presence of random noise. While the invention finds use in various types of information handling systems, it proves especially advantageous in connection with signal correlation, Doppler radar, and other systems wherein the noise level varies with time.

In the signal correlation process, two signals having mutually coherent components are multiplied together and the resultant product is integrated over a period of time to produce an output signal. The value of this output signal is maximum only when the coherent components of the two signals are in time agreement. Thus the possible value of time delay between two versions of a given signal may be measured by imposing different values of known delay between the two signal versions during the signal correlation process. When the output signal is maximized, time agreement between the two signal versions is then indicated. The known value of imposed signal delay producing this maximum then corresponds to the initial value of time delay to be measured.

This signal correlation process is often used in position determining systems to determine the position of a target relative to a number of pairs of spaced stations. In this position determining system, an information signal containing an information component is transmitted from the target (either intentionally or inadvertently) and is received by a plurality of spaced apart stations. Each of the stations in a station pair receives a version of the signal over a different path. By the signal correlation process the value of time delay between any two versions of the signal may be measured. The time delay between the receipt of the signal versions at the stations in each station pair can be used as a basis for calculating the position of the target relative to the stations. However, each of the received signal versions usually includes a random noise component along with the information component, and the level of this noise component may approach or even exceed the level of the information component. Furthermore, the level of the noise component is usually undergoing continuous change. Consequently, the correlation information, contained in the signal correlation output signal used in determining the time delay to be measured, may be masked by the random noise component that was processed along with the information component. It may therefore be difficult to detect maxima in the output signal indicating the time agreement between coherent components in the two signal versions.

The foregoing noise problem proves especially serious in the use of what is usually referred to as A.C. signal correlation. In A.C. signal correlation two similar signals, differing from each other substantially only in phase (i.e., time) are correlated by first subjecting one of the two signals to a change in frequency (as by means of heterodyning) and then multiplying the signal thus derived with the other of the two signals. The multiplication of these two signals produces an alternating current product resultant. (The foregoing A.C. correlation is to be distinguished from D.C. correlation wherein the two similar signals are directly correlated with each other without frequency change, the multiplication of the two signals here directly producing a direct current resultant.) The alternating current product resultant is usually then passed through a band-pass filter to derive a difference frequency signal representing difference frequency information contained in the product resultant. This difference frequency signal is then envelope detected or rectified and integrated to yield a direct current output voltage the value of which becomes maximum when time agreement between the two signal versions occurs.

Inasmuch as the band-pass filter must have some finite bandwidth, that component in the difference frequency signal which represents noise may be detected or rectified to give rise to a quiescent direct current, noise-representing voltage at the output of the correlation apparatus. This quiescent, noise-representing voltage that appears together with voltage representing correlation information may, because of inherent system noise, be independent of the signals fed into the correlation apparatus. Indeed, this quiescent voltage is often present even where no signals are applied to the correlator. This quiescent direct current noise representing voltage component may have a higher amplitude than that of any voltage component indicating correlation of coherent components in the signals applied to the correlator. Consequently, any correlation of coherent information signal components will usually give rise to only a relatively slight increase in the overall direct current voltage output from the correlation apparatus. This relatively slight increase in direct current voltage output from the correlation apparatus may be difficult to detect.

While noise reduction arrangements are known, in the prior art, these arrangements have not proven completely satisfactory when used in A.C. signal correlation apparatus. For example, most of the arrangements presuppose a noise level that remains substantially constant over a relatively long period of time, whereas the quiescent voltage level at the output of the correlation apparatus is subject to change with changes in amplitude of either or both of the random noise signals. The present invention however overcomes this particular problem associated with such signal correlation processes.

On the other hand the present invention also proves advantageous in a Doppler radar system. In such a system the information content of a return or echo signal derived by mixing a transmitted radar signal with its echo reflected from a moving target is a measure of the relative velocity of the target. However, the random noise normally accompanying the receipt of the varying frequency echo signal often masks the information content of this signal; this is especially true where the random noise level is of the order of, or is higher than, the level of the information content. Since the return or echo signal may appear anywhere within a relatively wide frequency band, the relatively great amount of random noise in the frequency band makes the detection of the information content especially difficult. In this connection the present invention facilitates the detection of low level signals superimposed upon relatively high level noise as sometimes encountered in such Doppler radar systems.

It is therefore an object of the invention to provide means for detecting weak signals in systems of the type described, so that the detecting means is insensitive to changing noise levels.

Another object is to provide more reliable means for detecting the presence of information signals in signal correlation apparatus.

A further object is to facilitate the detection of a signal of varying frequency, such as a Doppler frequency signal in a radar system under conditions of low signal to noise ratio.

The present invention provides a novel signal detecting apparatus which indicates the presence of a desired signal by comparing the energy content of a band of signal frequencies in which the desired signal falls, with the energy content of another band of signal frequencies near to but not embracing said first mentioned band.

In more detail, apparatus is provided for detecting an information signal superimposed on noise energy where the signal frequencies which effectively define the information signal occupy a first band of frequencies substantially narrower than and within a second band of signal frequencies defining the noise energy. The apparatus includes means for examining the composite energy wave made up of the information signal and the noise energy over two discrete third and fourth portions of or bands within the second band. The third portion or third band of signal frequencies falling within the second band of frequencies is substantially exclusive of the first band of frequencies. The other portion or fourth band of signal frequencies falling within the second band of frequencies includes at least a substantial portion of the first band of frequencies.

First and second alternating current indicating signals are developed representing the power contents of the third and fourth bands respectively, as by filter means tuned to said bands. The alternating current signals are rectified and filtered to produce two direct current signals. These direct current signals are subtractively combined to produce an output signal. By adjustment of one of the two direct current signals, the output signal is made to be substantially zero in the absence of the information signal. This effectively cancels or neutralizes the effects of noise energy, since under the no information signal condition the two direct current signals which are subtracted represent noise energy only. The quiescent output voltage is thereby eliminated, and it remains at substantially zero regardless of any variation in the noise level.

However, in the presence of the information signal the direct current signal representing the energy in the fourth band of signal frequencies, which includes the information signal, will rise as a function of the information signal, so that the resultant output signal will be some absolute value which will represent the information signal only.

In one specific embodiment, the invention is disclosed in connection with A.C. signal correlation apparatus wherein it is desired to correlate two coherent signals which are superimposed on two non-coherent noise signals. The term coherent here means that the two signals have substantially identical time-amplitude functions although possibly displaced in time from one another by a predetermined amount. Thus, two signals emanating from the same source are coherent, whereas two unrelated signals not emanating from the same source are usually non-coherent. As above noted, in the A.C. signal correlation process, one of two mutually coherent signals is shifted in frequency by a predetermined amount with respect to the other mutually coherent signal prior to their multiplication. Multiplication of the two coherent and non-coherent signals then produces a resultant signal made up in part of an information signal occupying a first band of signal frequencies. This first band is made up substantially of a difference frequency component equal to the predetermined amount that one signal has been shifted in frequency with respect to the other. The remaining part of the resultant signal is made up of noise energy which results from the multiplication of the non-coherent noise signals. This noise energy occupies a second band within which the first band lies. Indicating signals representing the energy in third and fourth bands as above defined are developed and combined to produce a resultant direct current indicating signal which represents substantially only the difference frequency components constituting the information signal.

In accordance with another specific embodiment the invention is disclosed in connection with a Doppler radar system for detecting a Doppler frequency signal under conditions of low signal to noise ratio.

Figure 1:
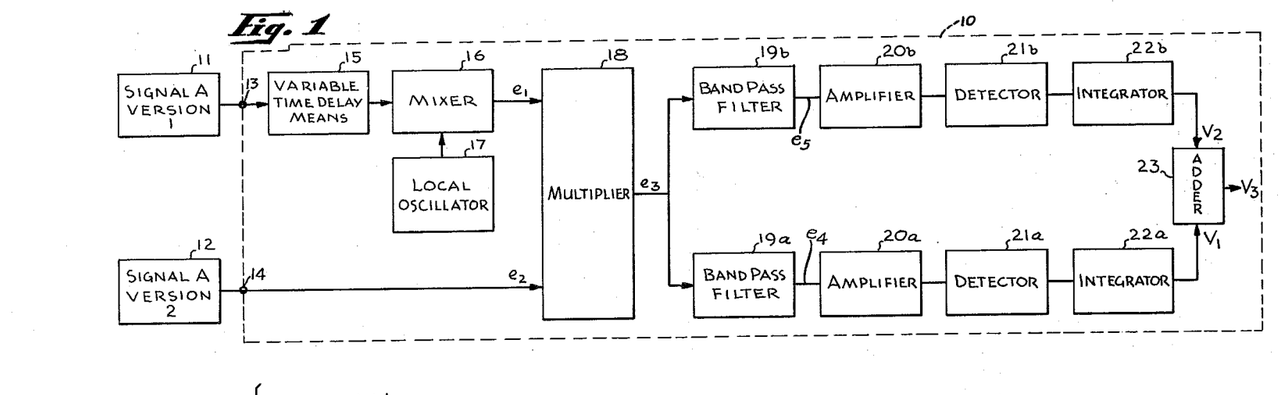
FIG. 1 is a block diagram of an A.C. signal correlation apparatus embodying the invention.

FIG. 1 shows one embodiment of the invention as exemplified in an A.C. signal correlation apparatus shown within the dotted line area 10. The signal correlation apparatus 10 may for example, be used in a position determining system to measure the value of time delay between two versions of a signal "A" transmitted from a target, as described previously. The two signal versions are indicated schematically as being applied from two sources 11 and 12, which may represent different transmission paths, to the input terminals 13 and 14 of the apparatus 10. The earlier received version 1 is applied to a variable time delay means 15 so that a series of known incremental time delays may be introduced between the two versions 1 and 2.

The apparatus 10 also includes means for establishing a predetermined frequency difference between the two signal versions. For this purpose, one of the versions, say version 1, may be heterodyned in a mixer 16 with the signal from a local oscillator 17. Alternatively, both versions may be transduced to two different frequencies.

The two signals, now differing in frequency, are then fed to a multiplier 18 where they are multiplied together. For convenience, the signals applied to the multiplier are labeled $e_1$ and $e_2$. The output signal $e_3$ of the multiplier 18 is fed to two band-pass filters 19a and 19b tuned to two predetermined frequency bands, the center frequencies of which will be designated $f_0$ and $f_x$, respectively. The bandwidths of the filters are designated $\Delta f_0$ and $\Delta f_x$ respectively. The output signal $e_4$ of filter 19a is amplified by an amplifier 20a and then sent through a detector 21a, and an averaging network or integrator 22a aso as to develop a first direct current voltage $v_1$, which for example is positive in polarity and whose magnitude is a function of the power passed by the filter 19a. Similarly, the output signal $e_5$ of filter 19b is amplified by an amplifier 20b and then sent through a detector 21b and an integrator 22b, so as to develop a second direct current voltage $v_2$ which is, for example, negative and a function of the power passed by the filter 19b. The two voltages $v_1$ and $v_2$ are combined in an adder 23 and produce a resultant output voltage $v_3$.

When signal correlation apparatus is used in a position determining system, signal information contaminated with random noise, is received at two receivers from a moving target. Briefly, in the process of correlating the two signals, such as the signal versions 1 and 2 to determine the value of time delay between them, known values of time delay are imposed between the two versions, as by the time delay means 15. Version 1 is subjected to a frequency change and this new signal is multiplied with version 2. The resultant difference frequency signal is detected and integrated to produce an output voltage. When the output voltage is maximized, time agreement between the two signal versions is indicated. The known value of imposed signal delay producing this maximum then corresponds to the initial value of time delay between the two versions. However, as discussed previously, the presence of random noise in the signal versions makes it difficult to detect maxima in the output voltage.

Figure 2:
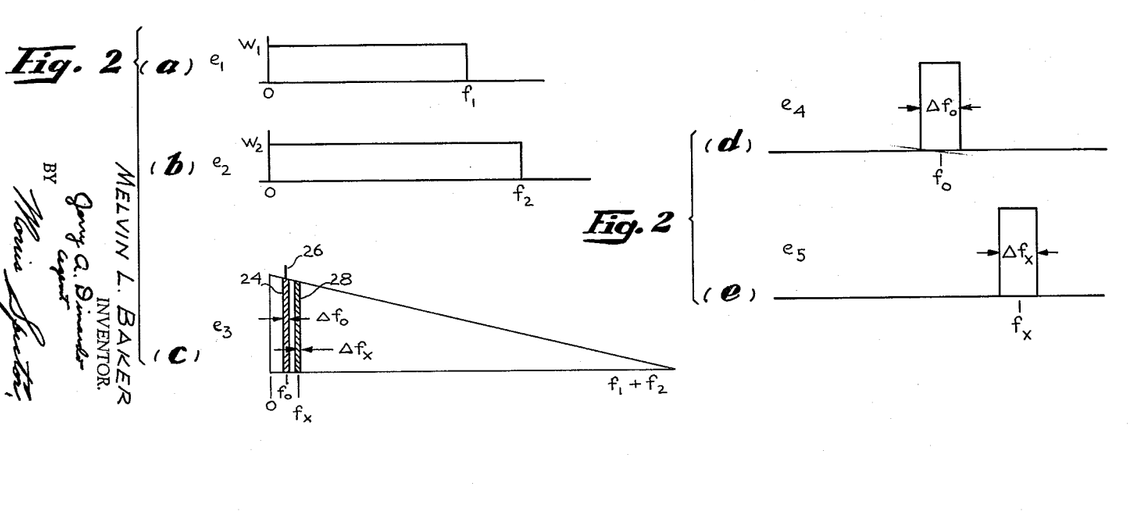
FIG. 2 is a series of graphs illustrating waveforms which are useful in explaining the operation of the invention.

For further explanation of the problem and how the invention overcomes this problem, reference is made to the graphs shown in FIG. 2. Assume that the signal inputs $e_1$ and $e_2$ are two non-coherent or unrelated signals of substantially white noise, that is, having constant power density $w_1$ and $w_2$ and limited bandwidths zero to $f_1$ and zero to $f_2$ respectively. Also, it will be assumed for illustrational purposes that the power-versus-frequency distribution of each of the respective white noise signals is uniform over the limited bandwidths mentioned. This is graphically depicted in FIGS. 2(a) and 2(b), respectively. Thus, the power-versus-frequency distribution, or more simply the "spectral distribution," of the respective signals may be referred to as rectangular in character. The resultant product or composite signal $e_3$ at the output of the multiplier 18 may be then represented as having a spectral distribution of power which is triangular in shape, as shown in FIG. 2(c), with maximum power occurring at zero difference frequency, and minimum power at the sum frequency of the two highest frequencies $f_1$ and $f_2$ in the frequency bands defining the signals $e_1$ and $e_2$. The triangular appearance characterizing the graphic display in FIG. 2(c), which depicts the spectral distribution of the signal $e_3$, follows naturally from the multiplication of the two assumed uniformly distributed noise signals $e_1$ and $e_2$, as, for example, set forth on pages 296 and 297 of a book entitled "Principles and Applications of Random Noise Theory," by Julius S. Bendat, published by John Wylie and Sons, New York city, New York. It will be understood, however, that the present invention is in no way limited to the manner in which power is spectrally distributed within either of the input signals or the composite signal produced by the multiplier.

Referring again to FIG. 1, the filter 19a is designed to pass a band of frequencies, defined by $$f_0 \pm \frac{\Delta f_0}{2}$$

within which band there exists one of the frequency components defining the signal $e_3$ in the output of the multiplier 18, which causes an expected increase in power to occur. The expected increase in power may be brought about, for example by the addition of two coherent or related signals to the non-coherent signals $e_1$ and $e_2$, the related components of the coherent signals differing in frequency by the center frequency $f_0$, or by any frequency within the bandwidth $\Delta f_0$, of the filter 19a. The bandwidth of the filter 19a may be designed to accommodate variations in the difference frequency signal to be detected, which variations may result from a Doppler effect brought about by a moving target. In the case of a moving target, the two original signals may not arrive at the two receivers at the same frequency. When the two signals are transduced and combined to form a difference frequency signal to be detected, it will be seen that the difference frequency will vary within some band of frequencies depending on the magnitude of the Doppler effect.

However, for the present it is assumed that the input signals $e_1$ and $e_2$ are entirely non-coherent, that is, they consist only of noise energy and no information signal. The power contained in the frequency components passed by the filter 19a will be represented by the cross-hatched area 24 in FIG. 2(c). The D.C. output voltage $v_1$ of the integrator 22a will be proportional to the area 24 and will vary in accordance with the input signals $e_1$ and $e_2$.

Now assume a small addition of coherent information signal super-imposed on each of the noise signals $e_1$ and $e_2$, wherein the related frequency components of the coherent signals differ in frequency by the center frequency $f_0$ of the filter 19a. Multiplication of the two composite signals including noise and information signals will give rise to an increase in the power of only this difference frequency component $f_0$ which is passed by the filter 19a, the increase being represented by the spike 26 in FIG. 2(c). The problem faced in the prior art was to detect this weak increase in power. The increase in power may be said to occur in a first band of signal frequencies effectively defined by the difference frequency $f_0$, which lies within and is substantially narrower than the second band (from zero to $f_1+f_2$) defining the noise energy. It is clear that a quiescent voltage $v_1$ is always present in the output of the integrator 22a as long as non-coherent signals are being received. Furthermore, this voltage varies with the level of non-coherent input signals. It will be appreciated that great difficulty will be experienced in detecting weak coherent signals in the presence of the high noise power represented by the non-coherent signals, due to the inherent difficulty of detecting a small change in a relatively large voltage.

This problem is solved in accordance with this invention by the addition of the filter 19b, the detector 21b, and the integrator 22b. The filter 19b is designed to pass a third band of frequencies slightly offset from the fourth band passed by the filter 19a, and exclusive of the first band, the center frequency and bandwith of the additional filter 19b being $f_x$ and $\Delta f_x$ respectively. The center frequencies of the filters 19a and 19b, i.e., $f_0$ and $f_x$, respectively are preferably separated sufficiently to avoid any overlapping of the third and fourth frequency bands. While it is not necessary that the bandwidths $\Delta f_0$ and $\Delta f_x$, be equal, they should be nearly so, in order that the energy in the third and fourth bands be substantially equal, as indicated by the two shaded areas 28 and 24 respectively in FIG. 2(c). The spectral distribution of typical noise signals passed by the two filters 19a and 19b are shown in FIG. 2(d) and FIG. 2(e), respectively.

The output of the additional integrator 22b is adjusted so as to produce an output voltage $v_2$ which is equal in magnitude but opposite in polarity to the voltage $v_1$, in the output of the first integrator 22a, under the condition where the input signals consist only of non-coherent signals $e_1$ and $e_2$. Under these conditions, the net signal output $v_3$ from the adder 23 will be zero, thereby resulting in the effective cancellation of the noise power and the elimination of the above-mentioned quiescent voltage. The net signal output from the adder 23 will be maintained at zero, even under changes in the levels of the non-coherent signals $e_1$ and $e_2$. The variations in the non-coherent signals $e_1$ and $e_2$ merely cause the entire level of the composite noise signal $e_3$ to raise or lower and consequently cause the noise power passed by the two filters 19a and 19b and the D.C. output voltages $v_1$ and $v_2$ to change in the same direction.

However, if two coherent signals separated in frequency by $f_0$ are added to the non-coherent signals $e_1$ and $e_2$, so as to produce an increase in the amount of signal information at the difference frequency $f_0$ (falling within the first band), which is superimposed on the noise energy component of signal $e_3$ (falling within the second band), the energy in the fourth band passed by the filter 19a tuned to the difference frequency $f_0$ will increase by the amount of information signal energy, while the energy in the third band, passed by the filter 19b tuned to the frequency $f_x$ displaced from $f_0$ will remain the same. Consequently, the detected output voltage $v_2$ will remain the same, but the voltage $v_1$ will increase. As a result, there will be an increase in the net output $v_3$ of the adder 23, which is a function of the product of the two coherent signals superimposed on the non-coherent signals $e_1$ and $e_2$, and which represents substantially only the power contained in the information signal energy. This net increase is readily detectable from the zero output condition.

By way of example, suitable circuitry for that portion of the signal correlation apparatus shown in FIG. 1, including and following the multiplier 18, will now be described in more detail with the aid of FIG. 3. The multiplier 18, as shown, is of the balanced modulator type. One of the input terminals 29 of the multiplier 18 is connected to the primary winding 30 of a transformer 32. The other input terminal 33 of the multiplier is connected to the primary winding 34 of a second transformer 36. The two secondaries 38 and 40 of the transformers 32 and 36, which have their center taps grounded, are connected to an array of eight resistors 42. The ends of the resistors 42 not connected to the transformers 32 and 36 are connected in pairs so as to produce at their junctions the sums and differences of the two signals $e_1$ and $e_2$ applied to the primary windings 30 and 34. Two of the resistor pairs are connected to the positive terminals respectively of a first pair of rectifiers 44. The other two resistor pairs are connected to the negative terminals of a second pair of rectifiers 46. The other ends of the rectifiers 44 and 46 are connected together through an output bus 48. The output bus 48 is connected to the inputs of the filters 19a and 19b respectively.

Filter 19a comprises a pair of resistors 50 and 52 connected in series between the bus 48 and ground, and a parallel resonant tuned circuit including a capacitor 54 and an inductor 56 connected at one end to the junction of the resistors 50 and 52. The other end of the tuned circuit is connected in a feedback circuit, as will be explained. The output of the filter 19a is connected to the amplifier unit 20a.

The amplifier unit 20a here shown by way of example may comprise two transistors 58 and 60 connected to produce two stages of amplification, and a third transistor 62 connected in an emitter follower circuit. The two amplifying transistors 58 and 60 are connected in grounded emitter circuits. Alternating current feedback is produced between the emitter follower stage (transistor 62) and the first amplifier stage (transistor 58) through a series connected resistor 64 and capacitor 66, in order to maintain the overall gain of the amplifier unit 20a constant. To maintain the D.C. bias level of the first amplifier stage constant, D.C. feedback between the two amplifier stages is effected through connection between the tuned circuit of the filter 19a and the junction of two resistors 68 and 70 connected in the emitter circuit of the second amplifier, the two resistors 68 and 70 being bypassed by capacitors 72 and 74 respectively. The output of the emitter follower is connected to the detector 21a through a coupling capacitor 76.

The detector 21a consists of two diodes 78 and 80 and two resistors 82 and 84 connected in a series circuit. The integrator 22a comprising a resistor 86 and a capacitor 88 is connected across the diode load resistor 82 so that a D.C. output can be taken from the output capacitor 88. The detector 21a and integrator 22a are designed to rectify a time varying signal supplied to the input of the detector 21a and to produce a direct current voltage which is representative of the average value of the rectified signal.

The filter 19b, amplifier unit 20b, detector 21b and integrator 22b are similar to the corresponding units 19a, 20a, 21a, and 22a respectively, with a few exceptions. One difference is that the two filters 19a and 19b are tuned to different frequencies. Illustratively, if the two coherent signals applied to the multipler 18 differ in frequency by 50 kc., then the filter 19a may be tuned to 50 kc.±5 kc., corresponding to the difference frequency, with a bandwidth of 10 kc. being provided to accommodate frequency variations produced by moving targets. The filter 19b may be tuned to some frequency which is removed from 50 kc.±5 kc., such as 100 kc.±5 kc. For this purpose, the inductor 90 in the filter 19b may have a smaller inductance than the inductor 56 in filter unit 19a. A second difference is that one of the resistors 92 in the detector 21b is made variable so as to permit adjustment of the amount of voltage detected. Thirdly, whereas the diodes 78 and 80 in the detector 21a are connected for positive half-cycle rectification, the diodes 94 and 96 in the detector 21b are connected for negative half-cycle rectification. In this way, a positive D.C. voltage may be developed in the output of the first integrator 22a and a negative D.C. voltage may be developed in the output of the second integrator 22b.

The outputs of the integrators 22a and 22b are combined by connecting the positive terminal of the output capacitor 88 across which the positive voltage is developed, with the positive terminal of the output capacitor 98 across which the negative voltage is developed. Such connection is illustrated by the adder 23 shown in the block diagram of FIG. 1. Alternatively, the detectors 21a, 21b and integrators 22a, 22b can be designed to produce two direct current voltages of the same polarity, with means for inverting one of the voltages, and means for adding the inverted voltage to the other voltage.

An additional low pass filter comprising a resistor 100 and a capacitor 102, in series therewith, is then connected from the negative terminal of capacitor 98 to ground to provide the output voltage $v_3$ across capacitor 102.

Figure 3:
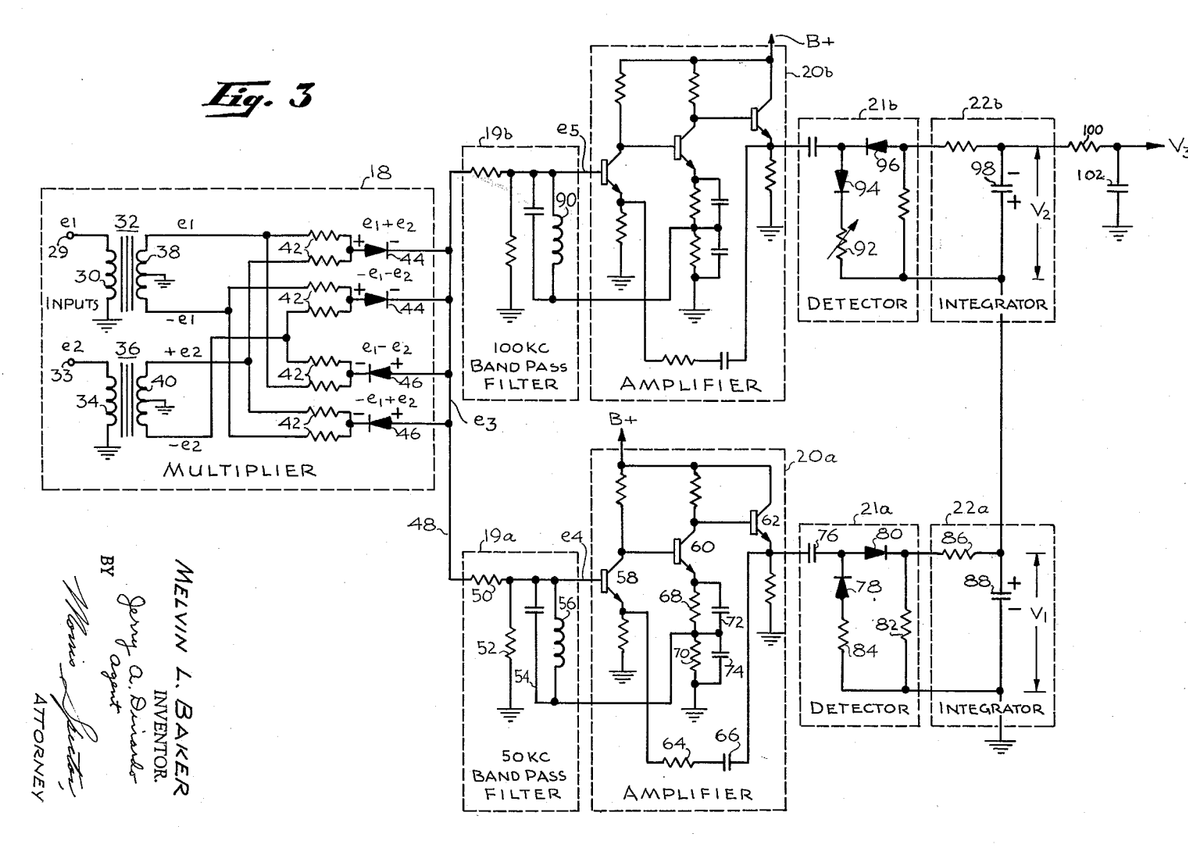
FIG. 3 is a schematic diagram showing a portion of the apparatus of FIG. 1 in more detail.

In the operation of the apparatus shown in the schematic diagram of FIG. 3, two non-coherent noise signals $e_1$ and $e_2$ applied to the input terminals 29 and 33 are combined in the multipler 18 to produce at the junction of the resistors 42 and the diodes 44 and 46 the four sums and differences of the signals $e_1$ and $e_2$. These four sum and difference signals are rectified and combined to produce a composite signal $e_3$, having a wide band of signal frequencies, at the common bus 48. The filter 19a will pass only the signal frequencies lying within the relatively narrow band of 50 kc.±5 kc., and the filter 19b will pass only the signal frequencies lying within the relatively narrow band of 100 kc.±5 kc., the two narrow band signals being designated $e_4$ and $e_5$ respectively.

The two narrow band signals $e_4$ and $e_5$ are amplified by the amplifier units 20a and 20b, are rectified by the detectors 21a, 21b, and integrated by the integrators 22a, 22b respectively.

From the two alternating current signals $e_4$ and $e_5$, two direct current voltages $v_1$ and $v_2$ of opposite polarity are developed in the outputs of the integrators 22a, 22b. One of the voltages, for instance the negative voltage $v_2$, is adjusted by means of the variable resistor 92 in the detector 21b, such that the summation of the two direct current voltages $v_1$ and $v_2$ will produce substantially zero direct current voltage $v_3$ across the output capacitor 102.

When two coherent signals are applied to the input terminals 29 and 34 along with the incoming signals $e_1$ and $e_2$, such that the coherent signals differ in frequency by the center frequency, 50 kc., of the filter 19a, the amount of signal will not change in the portion including units 19b, 20b, 21b, and 22b because that portion is tuned to frequencies (100 kc.±5 kc.) which are outside the band defining the difference frequency (50 kc.±5 kc.). However, in the portion including units 19a, 20a, 21a, and 22a there will be an increase in the signal energy contained in the difference frequency component, namely 50 kc. As a result, the positive direct current output voltage $v_1$ of the integrator 22a will increase. Since the positive direct current output voltage $v_1$ of the integrator 22 is now greater than the negative direct current output voltage $v_2$ of integrator 22b there will be a net positive direct current voltage $v_3$ appearing across the output capacitor 102. This net positive voltage will be representative only of the coherent signals applied to the correlation apparatus.

Figure 4:
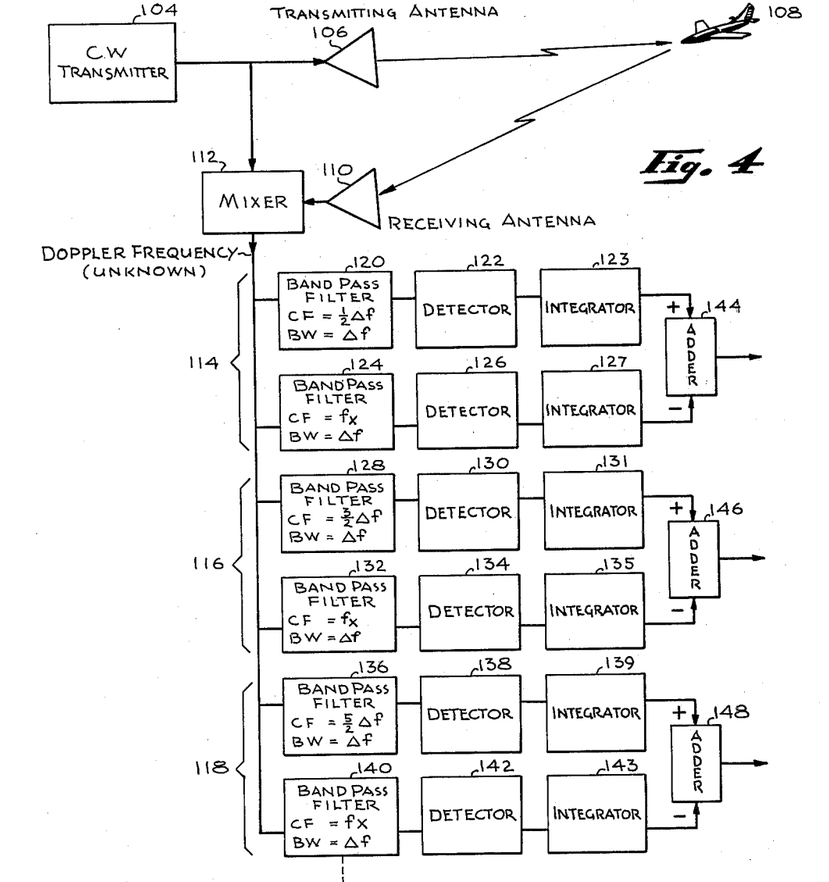
FIG. 4 is a block diagram of a portion of a Doppler radar system employing apparatus embodying the invention.

While the invention finds particular utility in signal correlation apparatus wherein it is sought to cancel the quiescent voltage resulting from the presence of non-coherent signals, it has broad application in other systems where it is desired to cancel the effect of extraneous noise. In FIG. 4, the invention is shown as applied to a Doppler radar system for more easily determining the band of frequencies within which the Doppler frequency lies.

Referring to FIG. 4, a continuous wave radar transmitter 104 and transmitting antenna 106 are arranged to transmit a constant frequency signal. If the target to be detected is a radially moving object 108, such as an aircraft, the signal which is reflected by the moving target and received by a receiving antenna 110 will not be of the same frequency as the transmitted signal. To detect the presence of the moving target 108 the transmitted and received signals are combined in a mixer 112 to produce a Doppler frequency $f_d$, the frequency of which is a function of the line of sight velocity of the target 108 with respect to the receiving antenna 110.

Figure 5:
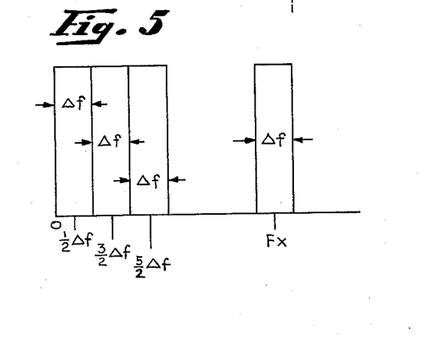
FIG. 5 is a graph showing the frequency response of certain filters in the apparatus of FIG. 4.

One known means of determining the Doppler frequency comprises applying the received signal to a parallel array of filter channels tuned to different frequencies. Each of the channels includes a filter, a detector and an integrator connected in series. The detected and integrated outputs of the filters serve to indicate the band of frequencies within which the unknown signal lies. As in the case of the correlation system above described, the inherent noise in the radar system gives rise to a quiescent output signal. In accordance with this invention, the quiescent signal may be cancelled by providing an additional filter, detector and integrator combination in each of the parallel channels. Referring to FIG. 4, the Doppler frequency signal is applied to a plurality of parallel channels, three only being shown, which are numbered 114, 116, 118. Each of the channels, for example, channel 114, includes a first filter 120, a first detector 122, and a first integrator 123 connected in series with each other and in parallel with a series connected second filter 124, second detector 126 and second integrator 127. Similarly, in channel 116, filter 128, detector 130, and integrator 131 are in parallel with filter 132, detector 134, and integrator 135, and in channel 118, filter 136, detector 138, and integrator 139 are in parallel with filter 140, detector 142, and integrator 143. One of the filters in each channel, for example, filters 124, 132, 140 is tuned to the same frequency band, which will be designated as having a center frequency $f_x$ and a bandwidth $\Delta f$. The frequency $f_x$ of these filters is greater than a predetermined frequency, which is the maximum expected Doppler frequency. The other filters 120, 128, 136 which serve to identify the Doppler frequency, are tuned to frequencies which are different from the frequency $f_x$, the frequencies and bandwidths of these other filters being selected to cover in discrete bands all frequencies between zero and said maximum expected Doppler frequency. For instance, the filter 120 in the first channel 114 has a center frequency of $\frac{1}{2}\Delta f$ and a bandwidth $\Delta f$. The corresponding filter 128 in the second channel 116 has a center frequency of $\frac{3}{2}\Delta f$ and a bandwidth $\Delta f$. The next corresponding filter 136 has a center frequency of $\frac{5}{2}\Delta f$ and a bandwidth $\Delta f$. The different frequency bands occupied by the filters in the two channels is illustrated in FIG. 5. For simplicity, the two filters of each channel have been described as having equal bandwidth $\Delta f$, but it will be understood that the bandwidths need not be exactly equal, as was indicated in the previous embodiment.

In further accordance with the invention, the two detected and integrated outputs in each channel are subtractively combined in an adder, the three adders being numbered 144, 146, 148. In this way, any extraneous noise which comes through the separate channels will produce in each channel two direct current voltages which are subtractively combined to produce a zero difference output in all of the channels in the absence of a Doppler frequency signal. The outputs of the integrators 127, 135 and 143 may be adjusted in the same manner as was described previously in connection with the signal correlator apparatus, to produce the zero difference voltages. The presence of the Doppler frequency signal will be readily detectable by a D.C. signal output in one of the channels only, the Doppler frequency being identified by that filter, such as one of the filters 120, 128 or 136 in the one channel yielding the D.C. output.

Figure 6:
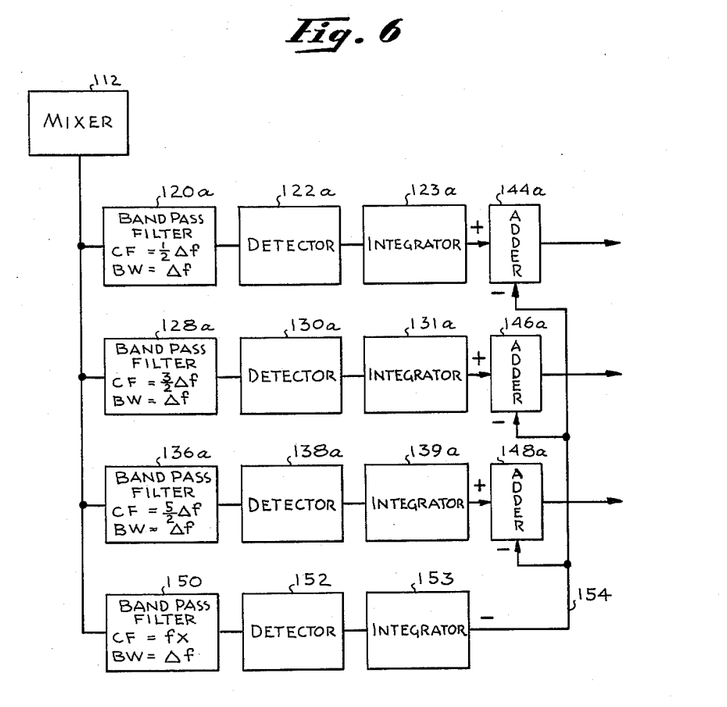
FIG. 6 is a block diagram showing a modification of the apparatus of FIG. 4.

In accordance with one modification, as shown in FIG. 6, the plurality of filters 124, 132 and 140 tuned to the frequency band having a center frequency $f_x$, is replaced by a single filter 150. A single detector 152 and integrator 153 are placed in series with the filter 150, and the output terminal of the integrator 153 is connected to a common bus 154. The detector 152 and integrator 153 are designed to produce a negative voltage at the output of the integrator 153, the negative voltage also appearing at the bus 154. A plurality of filter-detector-integrator combinations 120a, 122a, 123a; 128a, 130a, 131a; and 136a, 138a, 139a; which may be similar to the filters, detectors, and integrators 120, 122, 123; 128, 130, 131; and 136, 138, 139; are connected in parallel with the filter 150, detector 152, and integrator 153 so as to produce a positive voltage at the output of each of the integrators 123a, 131a, and 139a. The positive voltages from the integrators 123a, 131a, and 139a, and the negative voltage from the integrator 153 are subtractively combined in adders 144a, 146a, and 148a respectively.

Figure 7:
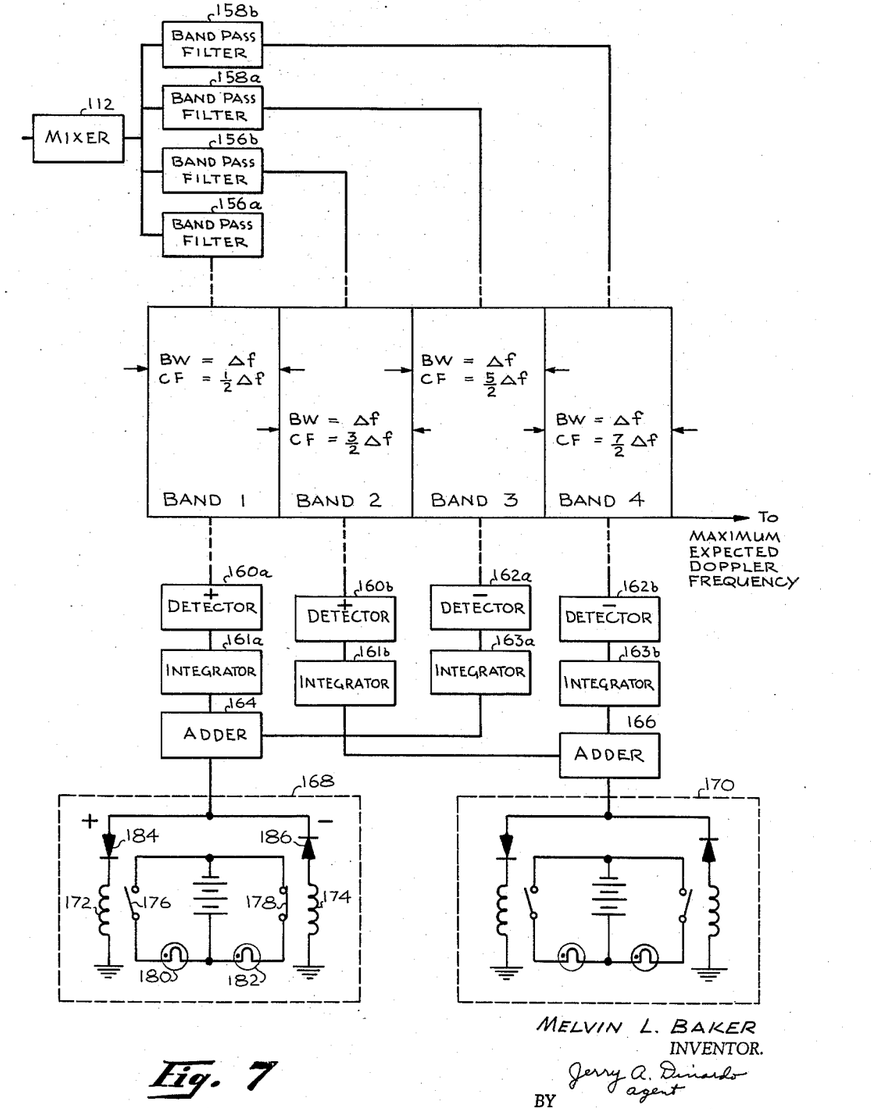
FIG. 7 is a block diagram of a further modification of the apparatus of FIG. 4.

In accordance with a still further modification, as shown in FIG. 7, the filter-detector-integrator combination associated with the frequency $f_x$ which is above the maximum expected Doppler frequency may be eliminated. Here it is assumed that only one Doppler return system signal is to be simultaneously received at any instant in time or that if several Doppler signals are received their amplitudes are substantially different. A plurality of filters 156a, 156b, 158a, 158b, detectors 160a, 160b, 162a, 162b, and integrators 161a, 161b, 163a, and 163b, covering in adjacent discrete bands all frequencies between zero and the maximum expected Doppler frequency, is provided, substantially as shown in FIGS. 4 and 6, but with different connections. In this case, the two outputs of the integrators associated with alternate frequency bands are combined in an adder so that their respective D.C. voltage outputs subtract from one another.

The positive voltage from positive detector 160a, and integrator 161a associated with band 1 is combined with the negative voltage from negative detector 162a and integrator 163a in adder 164. Similarly, the positive voltage from positive detector 160b and integrator 161b is combined with the negative voltage from negative detector 162b and integrator 163b in adder 166. Alternate ones of the frequency bands are chosen for comparison rather than adjacent ones to insure that a Doppler frequency signal lying midway between two adjacent bands will not escape detection.

The outputs of the adder units 164 and 166 are connected to indicating units 168 and 170 respectively. Each indicating unit, for example referring to unit 168, may comprise two relay coils 172, 174 connected in parallel across the output of the adder 164. Associated with the relay coils 172 and 174 are two switches 176 and 178 respectively. Each switch is in separate circuit with an indicating lamp, such as lamps 180 and 182. One of the relay coils 172 is connected in series with a rectifier 184 which is biased in one direction across the output of the adder 164. The other relay coil 174 is connected in series with a rectifier 186 which is biased in the opposite direction across the output of the adder 164.

In operation then, if a Doppler frequency signal lying in band 3 is received, there will be developed in the output of integrator 163a, a negative voltage which is in excess of the positive voltage output of the integrator 161a. When these two voltages are combined in the adder 164, the resultant negative voltage will cause current flow in relay coil 174 but not in relay coil 172. When relay coil 174 is energized, switch 178 will close, whereupon indicator lamp 182 will light up, indicating that the Doppler frequency lies in band 3.

It is now apparent that the invention facilitates the detection of weak signals in various systems wherein relatively high level noise is present or wherein changing noise levels occur.

What is claimed is:

1. In apparatus for correlating a first version of an information signal superimposed upon first random noise energy and a second version of said information signal superimposed upon second random noise energy and wherein the signal frequencies defining said first and second versions are displaced by a predetermined difference frequency, the combination comprising means for multiplying together said first and second noise energies and said first and second versions superimposed thereon to produce a third information signal superimposed on noise energy which is a composite of said first and second noise energies, said third information signal being defined by a first band of signal frequencies made up substantially only of a single frequency component equal to said predetermined difference frequency and falling within a relatively wide second band of signal frequencies defining said composite noise energy, means for developing a first indicating signal representing the power content of a third band of signal frequencies falling within said second band of frequencies and substantially exclusive of said first band of frequencies, means for developing a second indicating signal representing the power content of a fourth band of signal frequencies falling within said second band and including said predetermined difference frequency, and means for combining said first and second indicating signals to form a resultant signal which is representative substantially only of said single difference frequency component.

2. In a signal correlator apparatus for correlating two versions of a first information signal the components of which are related by a predetermined difference frequency and which versions are superimposed on random noise energy, wherein said apparatus includes means for multiplying said two versions so as to yield as a resultant product a second information signal defined by a first band of frequencies and superimposed on random noise energy defined by a relatively wide second band of frequencies which embraces said first band, said first band consisting essentially of a single frequency signal the frequency of which is equal to said predetermined difference frequency relating said two versions, the combination of means for detecting said second information signal and comprising means for developing a first alternating current indicating signal representing the energy content of a third band of signal frequencies falling within said second band and substantially exclusive of said difference frequency signal, means for developing a second indicating signal representing the energy content of a fourth band of signal frequencies falling within said second band and including said difference frequency, and means for combining said indicating signals to produce a direct current signal which represents substantially only said second information signal.

3. In a signal correlator apparatus for correlating two versions of a first information signal the components of which are related by a predetermined difference frequency and which versions are superimposed on random noise energy, wherein said apparatus includes means for multiplying said two versions so as to yield as a resultant product a second information signal defined by a first band of frequencies and superimposed on random noise energy defined by a relatively wide second band of frequencies which embraces said first band, said first band consisting essentially of a single frequency signal the frequency of which is equal to said predetermined difference frequency relating said two versions, the combination of means for detecting said second information signal and comprising a first filter means for passing a third band of signal frequencies falling within said second band and substantially exclusive of said first band, a second filter means for passing a fourth band of signal frequencies falling within said second band and including a substantial portion of said first band, first and second detector means operatively connected to the outputs of said first and second filter means respectively for producing two direct current signals representing the energy content in said third and fourth bands respectively, and means for combining said direct current signals to produce a third direct current signal which represents substantially only said second information signal.

4. In a signal correlator apparatus for correlating two versions of a first information signal the components of which are related by a predetermined difference frequency and which versions are superimposed on random noise energy, wherein said apparatus includes means for multiplying said two versions so as to yield as a resultant product a second information signal defined by a first band of frequencies and superimposed on random noise energy defined by a relatively wide second band of frequencies which embraces said first band consisting essentially of a single frequency signal the frequency of which is equal to said predetermined difference frequency relating said two versions, the combination of; means for detecting said second information signal and comprising a first band-pass filter means for passing a third band of signal frequencies falling within said second band and substantially exclusive of said first band, a second band-pass filter means for passing a fourth band of signal frequencies falling within said second band and including a substantial portion of said first band, amplifier means connected to the outputs of said first and second filter means, first and second detector and integrator means connected to the outputs of said amplifier means for producing two direct current signals representing the energy content in said third and fourth bands respectively, and means for combining said direct current signals to produce a third direct current signal which represents substantially only said second information signal.

5. Apparatus as in claim 4 wherein one of said detector means includes means for adjusting one of said direct current signals so that said third direct current signal is substantially zero in the absence of said second information signal.

6. In a signal correlator apparatus for correlating two versions of a first information signal the components of which are related by a predetermined difference frequency and which versions are superimposed on random noise energy, wherein said apparatus includes means for multiplying said two versions so as to yield as a resultant product a second information signal defined by a first band of frequencies and superimposed on random noise energy defined by a relatively wide second band of frequencies which embraces said first band, said first band consisting essentially of a single frequency signal the frequency of which is equal to said predetermined difference frequency relating said two versions, the combination of means for detecting said second information signal and comprising means for combining said indicating signals to produce a third indicating signal, and means for adjusting one of said first and second indicating signals so that in the absence of said information signal said third indicating signal is substantially zero but in the presence of said information signal said third indicating signal will represent substantially only said information signal.

7. In a system for determining the position of a moving target wherein first and second versions of a signal transmitted from said target are received at a given station and transduced to two signal versions, the components of which are related by a predetermined difference frequency which varies within a first given band of frequencies due to Doppler frequency shift brought about by said moving target, and which two signal versions are superimposed on random noise energy, the combination of means for correlating said two signal versions and including means connected to multiply said two signal versions to produce a resultant information signal the signal frequencies of which fall within said first given band, said resultant information signal being superimposed on random noise energy defined by a relatively wide second band of frequencies embracing said first given band, means connected to develop a first indicating signal representing the power content of a third band of signal frequencies falling within said second band and substantially exclusive of said first band, means connected to develop a second indicating signal representing the power content of a fourth band of signal frequencies falling within said second band and including said first band, and means connected to combine said first and second indicating signals to produce a resultant indicating signal which represents substantially only said resultant information signal.

8. Apparatus for correlating two signal versions having substantially the same amplitude-time characteristics but with one version being delayed with respect to the other, and each of said versions being superimposed on random noise energy, said apparatus comprising means connected to variably delay one of said versions with respect to the other for establishing closer coincidence between said versions, means connected to transduce at least one of said versions to establish a predetermined frequency difference between said at least one version and the other version, means connected to multiply said at least one version with said other version to produce a resultant product signal having an information component and a noise component, said information component being defined by a first band of frequencies which is narrower than and which falls within a second band of frequencies defining said noise component, said first band including said predetermined frequency difference, means connected to develop a first indicating signal representing the power content of a third band of frequencies falling within said second band and substantially exclusive of said first band, means connected to develop a second indicating signal representing the power content of a fourth band of frequencies falling within said second band and including at least a substantial portion of said first band, and means connected to combine said indicating signals to produce a resultant indicating signal which represents substantially only said information component.

9. Apparatus for correlating two signal versions having substantially the same amplitude-time characteristics and each of such versions being superimposed on random noise energy, said apparatus comprising means connected to multiply said two versions together to produce a resultant product signal having an information component and a noise component, said information component being defined by a first band of frequencies which is narrower than and which falls within a second band of frequencies defining said noise component, means connected to develop a first indicating signal representing the power content of a third band of frequencies falling within said second band and substantially exclusive of said first band, means connected to develop a second indicating signal representing the power content of a fourth band of frequencies falling within said second band and including at least a substantial portion of said first band, and means connected to combine said indicating signals to produce a resultant indicating signal which represents substantially only said information component.

10. The apparatus defined by claim 9, wherein each said means for developing said first and second indicating signals comprises detector means and integrator means.

11. Apparatus for correlating two signal versions having substantially the same amplitude-time characteristics but with one version being delayed with respect to the other, and each of said versions being superimposed on random noise energy, said apparatus comprising means connected to variably delay one of said versions with respect to the other for establishing closer coincidence between said versions, means connected to multiply said two versions together to produce a resultant product signal having an information component and a noise component, said information component being defined by a first band of frequencies which is narrower than and which falls within a second band of frequencies defining said noise component, means connected to develop a first indicating signal representing the power content of a third band of frequencies falling within said second band and substantially exclusive of said first band, means connected to develop a second indicating signal representing the power content of a fourth band of frequencies falling within said second band and including at least a substantial portion of said first band, and means connected to combine said indicating signals to produce a resultant indicating signal which represents substantially only said information component.

12. The apparatus defined by claim 11, wherein each said means for developing said first and second indicating signals comprises detector means and integrator means.

References Cited in the file of this patent

UNITED STATES PATENTS

| | | |
|---|---|---|
| 1,743,124 | Esau | Jan. 14, 1930 |
| 2,227,415 | Wolff | Dec. 31, 1940 |
| 2,416,895 | Bartelink | Mar. 4, 1947 |
| 2,422,374 | Strebe | June 17, 1947 |
| 2,896,205 | Berger | July 21, 1959 |